(12) United States Patent
Guo et al.

(10) Patent No.: US 8,849,822 B2
(45) Date of Patent: Sep. 30, 2014

(54) METHOD FOR GENERATING SEARCH RESULT AND SYSTEM FOR INFORMATION SEARCH

(75) Inventors: Ning Guo, Hangzhou (CN); Yuheng Xie, Hangzhou (CN); Fei Xing, Hangzhou (CN); Lei Hou, Hangzhou (CN); Qin Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 48 days.

(21) Appl. No.: 12/863,473

(22) PCT Filed: Apr. 29, 2010

(86) PCT No.: PCT/US2010/033010
§ 371 (c)(1),
(2), (4) Date: Dec. 28, 2010

(87) PCT Pub. No.: WO2010/132212
PCT Pub. Date: Nov. 18, 2010

(65) Prior Publication Data
US 2012/0047148 A1 Feb. 23, 2012

(30) Foreign Application Priority Data
May 12, 2009 (CN) .......................... 2009 1 0135277

(51) Int. Cl.
*G06F 7/00* (2006.01)
*G06F 17/30* (2006.01)

(52) U.S. Cl.
CPC ...... *G06F 17/3053* (2013.01); *G06F 17/30867* (2013.01); *G06F 17/30702* (2013.01); *Y10S 707/99937* (2013.01)
USPC ........... 707/736; 707/708; 707/710; 707/731; 707/999.007

(58) Field of Classification Search
CPC .......... G06F 17/3053; G06F 17/30873; G06F 17/30663
USPC ................................. 707/748, 736
See application file for complete search history.

(56) References Cited

U.S. PATENT DOCUMENTS 6,963,867 B2 * 11/2005 Ford et al. ...................... 707/752
7,146,416 B1 * 12/2006 Yoo et al. ....................... 709/224
(Continued)

FOREIGN PATENT DOCUMENTS

CN 101105801 1/2008
CN 101266620 A 9/2008
(Continued)

OTHER PUBLICATIONS

The Chinese Office Action dated Oct. 26, 2011 for Chinese patent application No. 200910135277.4, a counterpart foreign application of U.S. Appl. No. 12/863,473, 15 pages.
(Continued)

*Primary Examiner* — Hosain Alam
*Assistant Examiner* — Azam Cheema
(74) *Attorney, Agent, or Firm* — Lee & Hayes, PLLC (57) ABSTRACT

The present disclosure discloses a method for generating a search result and an information search system. The method for generating a search result includes: receiving, by an information search system, a search request; obtaining, by searching, a plurality of pieces of matching information that match the search request; obtaining a respective amount of user response associated with each of the plurality of pieces of matching information and further obtaining a total amount of user response associated with a respective categories to which each of the plurality of pieces of matching information belongs; and ranking the plurality of pieces of information to generate a search result based on the total amount of user response associated with the respective category to which each of the plurality of pieces of matching information belongs. By using the above technical scheme, a result of more rational ranking of matching information can be displayed to a user when the user performs a search, thus improving experience of the user.

20 Claims, 5 Drawing Sheets (56) References Cited

U.S. PATENT DOCUMENTS

| | | | |
|---|---|---|---|
| 7,246,128 B2 | 7/2007 | Jordahl | |
| 7,330,852 B2 | 2/2008 | Bailey et al. | |
| 7,447,678 B2 | 11/2008 | Taylor et al. | |
| 7,499,901 B2 * | 3/2009 | Crosby et al. | 706/48 |
| 7,523,095 B2 * | 4/2009 | Gates et al. | 1/1 |
| 7,620,572 B2 | 11/2009 | Bowman et al. | |
| 7,664,744 B2 | 2/2010 | Guha | |
| 8,010,537 B2 * | 8/2011 | Prasad Kantamneni et al. | 707/748 |
| 8,051,071 B2 * | 11/2011 | Dean et al. | 707/722 |
| 8,090,736 B1 * | 1/2012 | Knapp et al. | 707/760 |
| 8,112,426 B2 * | 2/2012 | Acharya et al. | 707/748 |
| 2002/0091591 A1 * | 7/2002 | Tsumura et al. | 705/28 |
| 2003/0028527 A1 | 2/2003 | Crosby et al. | |
| 2003/0195877 A1 * | 10/2003 | Ford et al. | 707/3 |
| 2006/0253428 A1 * | 11/2006 | Katariya et al. | 707/3 |
| 2007/0094242 A1 | 4/2007 | Dove et al. | |
| 2007/0100817 A1 * | 5/2007 | Acharya et al. | 707/5 |
| 2008/0172362 A1 | 7/2008 | Shacham et al. | |
| 2009/0106221 A1 | 4/2009 | Meyerzon et al. | |
| 2009/0125505 A1 * | 5/2009 | Bhalotia et al. | 707/5 |
| 2010/0082634 A1 * | 4/2010 | Leban | 707/741 |
| 2010/0153391 A1 * | 6/2010 | Reese | 707/736 |

FOREIGN PATENT DOCUMENTS

| | | |
|---|---|---|
| JP | 2002183210 | 6/2002 |
| JP | 2004206517 | 7/2004 |
| JP | 20050099964 | 4/2005 |
| JP | 2007517317 | 6/2007 |
| JP | 2008299539 | 12/2008 |
| WO | WO2009031759 | 3/2009 |

OTHER PUBLICATIONS

Translated Japanese Office Action mailed Nov. 5, 2013 for Japanese patent application No. 2012-510843, a counterpart foreign application of U.S. Appl. No. 12/863,473, 8 pages.

Urashima, et al., "Construction of Log Data Condensation System with Clustering", Proceedings of the 2004 IEICE General Conference, vol. 1, No. D-6-15, p. 68, The Institute of Electronics, Information and Communication Engineers, Japan, Mar. 8, 2004.

The Extended European Search Report mailed Nov. 7, 2012 for European patent application No. 10775256.0, 6 pages.

* cited by examiner

METHOD FOR GENERATING SEARCH RESULT AND SYSTEM FOR INFORMATION SEARCH

CROSS REFERENCE TO RELATED PATENT APPLICATIONS

This application is a national stage application of international patent application PCT/US10/33010 filed Apr. 29, 2010, claiming priority from Chinese Patent Application No. 200910135277.4, filed May 12, 2009, both entitled "METHOD FOR GENERATING SEARCH RESULT AND SYSTEM FOR INFORMATION SEARCH," which applications are hereby incorporated in their entirety by reference.

TECHNICAL FIELD

The present disclosure relates to computer application field and, more particularly, to methods for generating a search result and an information search system.

BACKGROUND

An information search system is a system that is able to provide information search service to a user. An example is a commonly used search engine in the Internet. Given the usage in the Internet, search engines have become one of the indispensable tools for users to surf the web. From a user's perspective, a search engine normally provides a web page that includes a search box. The user inputs in the search box a keyword or other search criterion, which is subsequently submitted to the search engine by an associated browser. Thereafter, the search engine returns information that matches the keyword inputted by the user.

Given a user search request (e.g., a search keyword inputted by the user), the search engine is generally able to find a number of relevant pieces of information with the number probably reaching from several tens to several tens of thousands. From the user's perspective, only the information placed in relatively high ranks in the search result will the user pay attention to. Therefore, how to rank these pieces of information has become particularly crucial when the search engine provides a search result to the user. Whether or not the ranking of the search result is reasonable will have a direct impact on the user experience.

When the search engine ranks information, a variety of factors are taken into consideration. The factors that are considered may include, for example, sources of the information, reliabilities of the information, user response, and so forth. Among these factors, user response is a key factor that affects ranking of the search result. For instance, when a search keyword is "China Central Television", eighty percent of users click an official home page of the China Central Television. If user response is the only factor considered, the search engine may reasonably place the official web page of China Central Television at the top of a search result that corresponds to the keyword "China Central Television".

In order to achieve the aforementioned result, existing search engine counts the amount of user response associated with various pieces of information that match a search keyword, and generates search result for a user in a descending order based on the amount of user response. According to studies on existing technologies, the inventors have observed the following problems of the existing method for generating search result. For newly published information, an initial value for the amount of responses may be zero (or very low) that results in a low rank. Because of the low rank, newly published information can hardly be noticed by the user. Consequently, the ranking can hardly be improved. From another perspective, some user may quickly change the amount of responses through certain cheating practices (such as fraud clicks) to cause his/her published information to be placed in a higher rank within a search result, and thus affect normal benefits of other users. Therefore, from a user's point of view, search results that are generated by existing technologies have shortcomings that impact user experience.

SUMMARY OF THE DISCLOSURE

In order to solve the aforementioned problems, the present disclosure provides a method for generating a search result and an information search system, which are able to display a more reasonable ranking result of matching information and thereby improve user experience. The proposed technical scheme is described as follows.

The present disclosure provides a method for generating a search result, the method comprising: based on a received search request, obtaining a plurality of pieces of matching information that match the search request by searching in an information search system; obtaining a respective amount of user response associated with each of the plurality of pieces of matching information and a total amount of user response associated with a respective category to which each of the plurality of pieces of matching information belongs; and ranking the plurality of pieces of information to generate a search result based on the total amount of user response associated with the respective category to which each of the plurality of pieces of matching information belongs.

The present disclosure also discloses an information search system, the information search system comprising: an information searching unit that receives a search request and obtains, by searching, a plurality of pieces of matching information that match the search request; a user response computing unit that obtains a respective amount of user response associated with each of the plurality of pieces of matching information, and further obtains a total amount of user response associated with a respective category to which each of the plurality of pieces of matching information belongs; and a result generating unit that ranks the plurality of pieces of information to generate a search result based on the total amount of user response associated with the respective category to which the plurality of pieces of matching information belongs.

Compared with existing technologies, the technical scheme provided in the exemplary embodiments of the present disclosure does not use the amount of user response associated with individual pieces of information as a basis of ranking. Rather, the disclosed technical scheme uses the total amount of user response associated with the respective category to which the individual pieces of information belong as the basis of ranking. Therefore, even though the amount of user response for a piece of newly published information may be very small, this piece of information may still be placed in a relatively high rank if this piece of information belongs to a category that draws relatively more user attention. From another point of view, an increase in the amount of user response for an individual piece of information may not directly improve the ranking of the individual piece of information but instead may increase the ranking of a category to which this piece of information belongs. Therefore, effects of such cheating practices as fraud clicks on ranking in a search result may be effectively alleviated.

DESCRIPTION OF DRAWINGS

In order to aid the understanding of the technical scheme of the exemplary embodiments of the present disclosure, accompanying figures are provided and briefly described below. The following figures represent only a few exemplary embodiments of the present disclosure. Based on these accompanying figures, one of ordinary skill in the art can obtain other figures without inserting any creativity or effort.

DETAILED DESCRIPTION

An exemplary method for generating a search result in accordance with the present disclosure is first described herein. The method comprises: receiving a search request, by an information search system, and obtaining various pieces of matching information that match the search request by searching; inquiring a respective amount of user response associated with each of the various pieces of matching information and further obtaining a total amount of user response associated with a respective category to which each of the various pieces of matching information belongs; and ranking the various pieces of matching information to generate a search result based on the total amount of user response associated with the respective category to which each of the various pieces of matching information belongs.

In order to allow one of ordinary skill in the art to better understand the technical scheme of the present disclosure, the technical scheme in the exemplary embodiments of the present disclosure is described below with reference to the accompanying figures for the exemplary embodiments. The exemplary embodiments described herein only constitute parts, but not all, of exemplary embodiments of the present disclosure. Based on the exemplary embodiments of the present disclosure, all other embodiments derived by one of ordinary skill in the art, without any creative effort, are still within the scope of the present disclosure.

Figure 1:
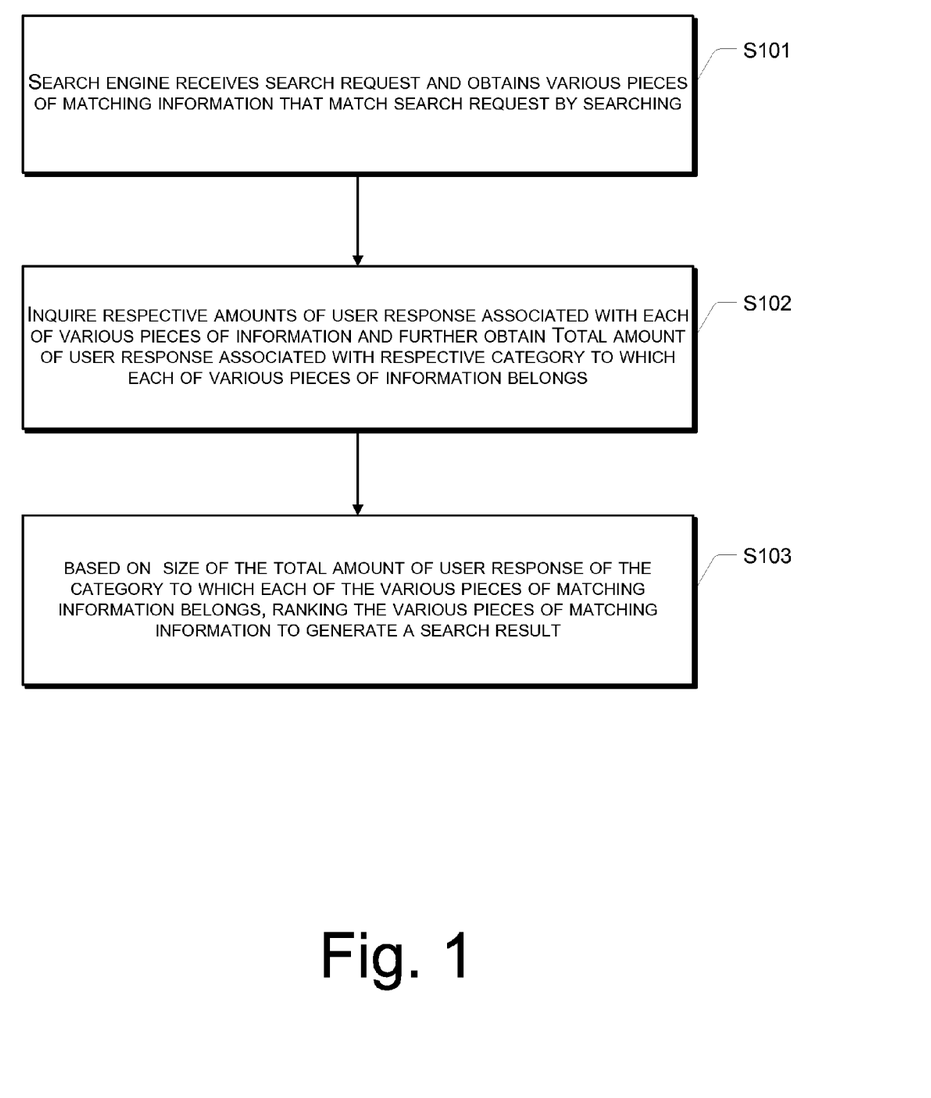
FIG. 1 shows a flow chart of an exemplary method for generating a search result in accordance with the present disclosure.

The following network search application is used as an example to explain in details the technical scheme provided in the present disclosure. FIG. 1 shows a flow chart of an exemplary method 100 for generating a search result as described below.

At S101, a search engine receives a search request and obtains, by searching, various pieces of matching information that match the search request.

When a user needs to find information online, the user inputs one or more search criteria. A commonly used search criterion is a search keyword. Some search engines may further support additional types of search criteria such as time of publishing information and properties of information according to different specific search application scenarios. In the exemplary embodiments of the present disclosure, each of various search criteria is generally referred to as a search request. Upon receiving a search request, the search engine searches for information that matches the search request. Depending on search application scenarios, different categories of information may be found. For example, in a search for a web page, the information to be found includes web pages. With respect to a search in electronic commerce, the information to be found includes products. In a thesis search, information to be found includes magazines or journal articles, etc. Because the method for finding information that matches the search request is similar to those in existing technologies, it will not be described in details in the exemplary embodiments of the present disclosure.

At S102, a respective amount of user response associated with each of the various pieces of information is obtained, and a total amount of user response associated with a respective category to which each of the various pieces of information belongs is also obtained.

The search engine is generally able to find multiple pieces of matching information that match a search request. The search engine follows certain rules to screen and rank these pieces of information in order to facilitate reading by the user.

Among these rules, user response is a key factor that affects ranking within a search result. The fundamental rule is to place the information that the user is concerned with the most at the top of the search result. In the exemplary embodiments of the present disclosure, the amount of user response is used as a parameter to reflect a degree of attention users may have for a certain piece of information. For example, a number of clicks of a web page link or a number of times the links are bookmarked, and so forth, can directly reflect a degree of attention users may have for the corresponding web page. Therefore, information such as the number of clicks on a link and/or the number of times the link is bookmarked can be regarded as a measure of the amount of user response for a web page. In electronic commerce, the amount of user response for a certain product can include information such as sales volume of the product, a total transaction amount of the product, a number of inquiries related to the product, and a number of times that pertinent product information is bookmarked. One of ordinary skill in the art can appreciate that a particular category of information may be selected to represent the amount of user response. Alternatively, multiple categories of information may be taken into consideration to represent the amount of user response. For example, $$\text{User response}=\text{sales volume of a product}\times 0.3+\text{a number of times being bookmarked}\times 2$$

$$\text{User response}=\text{a total transaction sales amount of a product}\times \text{a number of times that product information is bookmarked}+\log(\text{a total transaction quantity of the product})$$

and so on.

Generally, amount of user response is recorded in a user response log. By reading the user response log, the search engine can obtain respective amount of user response corresponding to various pieces of information. Furthermore, the search engine may selectively read the user response log that is within a certain time period (e.g., most recent week, most recent month, etc.) in order to adapt to ever-changing points of interest of the users.

For example, with respect to a certain search request, the search engine may find four pieces of matching information. Upon reading the user response log, the amount of user response associated with each of these four pieces of matching information is obtained and shown in Table 1.

TABLE 1

| Information | Amount of user response |
| --- | --- |
| Matching information 1 | 100 |
| Matching information 2 | 30 |
| Matching information 3 | 40 |
| Matching information 4 | 5 |

As illustrated in Table 1, size relationship of the amounts of user response for these four pieces of matching information is that matching information 1>matching information 3>matching information 2>matching information 4. If an existing technical scheme is used, a search result will typically be generated in this order and will be displayed to the user in that order. The technical scheme in the present disclosure, however, requires further processing on the amounts of user response of these various pieces of matching information.

Most of the time, a piece of online information is published according to a certain category. For example, categories of web pages in a portal website may include news, sports, entertainment and finance, and so on. Product categories in an electronic commerce website may include house furniture, electronics, clothes, food, and so on. Therefore, each piece of matching information found by the search engine has a corresponding category to which the matching information belongs. In the exemplary embodiments of the present disclosure, upon obtaining the amount of user response of the various pieces of matching information, categories to which respective pieces of matching information belong are first obtained. In case of a web page, corresponding category of the web page may be obtained through associated web address path. For instance, a web page with web address path including a "news" field may be categorized as a news-type web page while a web page with web address path that includes a "sports" field may be categorized as a sports-type web page. With respect to a product, corresponding category of the product may be obtained by directly acquiring its product information.

Furthermore, the total amount of user response of each category of the matching information is further computed. For example, matching information 1 and matching information 4 in the example shown in Table 1 belong to "Category A" while matching information 2 and matching information 3 belong to "Category B". Therefore, a total amount of user response for "Category A" is 100+5=105 while a total amount of user response for "Category B" is 30+40=70, as shown in Table 2.

TABLE 2

| Category | Total Amount of user response |
| --- | --- |
| Category A | 105 |
| Category B | 70 |

At S103, based on the size of the total amount of user response of the category to which each of the various pieces of matching information belongs, the various pieces of matching information are ranked to generate a search result.

As can be seen in Table 2, "Category A" received more user attention than "Category B". Therefore, information belonging to "Category A" would be presented prior to information belonging to "Category B" if the total amount of user response is the only factor considered.

For matching information 4, its amount of user response is very small. If existing technical scheme is used, matching information 4 will hardly obtain a high ranking under normal circumstances. The technical scheme of the present disclosure, however, does not use the size of the amounts of user response of each individual piece of information as a basis of ranking. Although the amount of user response of matching information 4 is very small, it belongs to a category that received relatively higher attention and thus matching information 4 is presented prior to matching information 2 and matching information 3 (or matching information 4 has a higher opportunity to be placed prior to matching information 2 and matching information 3) in a search result generated by the technical scheme in the present disclosure. Therefore, even newly published information may have more opportunities to obtain a higher ranking in a search result, thus better meet the practical needs of the user.

Based on Table 1, if a certain person recently publishes information 5 that matches the search request (and information 5 is assumed to belong to "Category C"), and the person uses such practices as fraud clicks to cause its amount of user response to reach 50 within a short period of time. If existing technical scheme is used, this matching information 5 will be placed directly at the second to the top position in the search result, and thus affects normal benefits of other information publishes. However, because the total amount of user response of Category C is less than those of Category A and Category B, matching information 5 still cannot obtain a high ranking in spite of cheating practices according to the technical scheme of the present disclosure. It is to be noted that the above example is merely for illustrative purpose. In a practical application, the number of categories of information and the number of matching information to be found may be in greater quantities. Although an individual user may improve the amount of response of one or more pieces of his/her published information through cheating practices, the total amount of user response of a category to which the information belongs can hardly be affected. Therefore, this can effectively reduce the influence of cheating on the search result ranking.

It is to be noted that the above exemplary embodiment ranks matching information simply by considering the amount of user response. In a practical application, the search engine may take multiple factors into consideration when generating a search result. Generally, each factor may be treated as a weighted parameter. Depending on respective degrees of importance of the factors, weighting coefficients are set up for each weighted parameter. By processing a weighted average of the weighted parameters to obtain a ranking score, the search engine finally determines the ranks of each piece of matching information in a search result based on respective ranking scores of the pieces of matching information.

If existing technical scheme is used, the weighting coefficient of a piece of matching information will increase as the amount of user response thereof increases. Under the technical scheme in the present disclosure, the weighting factor of a piece of matching information increases as the total amount of user response of a category to which the piece of matching information belongs increases. From the result shown in Table 2, the weighting coefficient for a parameter, the amounts of user response, of matching information 1 and matching information 4 is greater than that of matching information 2 and matching information 3. Compared with the existing technologies, matching information 1 has a higher opportunity to be placed in a high ranking position.

Specifically, weighting coefficient for each category of matching information may be computed based on a ratio value of total amount of user response of each category of matching information. Using Table 2 as an example, the total amount of user response of Category A is 105 while the total amount of user response of Category B is 70. Therefore, the ratio is 3:2. This ratio may further be normalized. For instance, total amount of user response of each category may be divided by the sum of all the total amount of user response of the categories, resulting in the ratio of 0.6 to 0.4. As such, weighting coefficients for the parameters, the amounts of user response, of matching information belonging to Category A and of matching information belonging to Category B are 0.6 and 0.4, respectively. Alternatively, total amount of user response of each category may be divided by a maximum value of total amount of user response among the categories, resulting in a ratio of 1 to 0.67. As such, weighting factors for the parameters, the amounts of user response, of matching information belonging to Category A and matching information belonging to Category B are 1 and 0.67, respectively.

Alternatively, the search engine may arrange categories of matching information according to respective total amount of user response, and obtain corresponding weighting coefficient of each category of matching information based on ranking result. For example, Table 3 shows:

TABLE 3

| Category | Total Amount of user response | Weighting Coefficient |
| --- | --- | --- |
| Category A | 1000 | 1 |
| Category B | 800 | 0.75 |
| Category C | 600 | 0.5 |
| Category D | 500 | 0.25 |
| Category E | 10 | 0 |

As illustrated, the resulting weighting coefficient obtained by each category of information relates only to respective ranking positions of the total amount of user response of each category, but does not relate to a value of total amount of user response. Specifically, for information belonging to Category E, a larger weighting factor may be obtained to improve its ranking only when the total amount of user response of Category E is greater than 500. Therefore, effects of cheating on the search result ranking can be further alleviated.

Two specific examples of computing weighting coefficients are described above. Based on the principle that "the larger a total amount of user response of a category to which a piece of matching information belongs, the larger an associated weighting coefficient is," one of ordinary skill in the art may integrate other specific requirements and adopt other technical practices to compute weighting coefficients. Such derived technical practices still fall within the scopes of the present disclosure.

In a practical application, when multiple factors are taken into consideration, an approach of performing multiple rankings in addition to or alternative to the approach of using weighting factors may be used. Specifically, upon ranking matching information based on one (or more) factor for the first time, a result of the first ranking may be ranked for a second time based on one (or more) another factor.

Based on the technical scheme provided in this disclosure, one of ordinary skill in the art can easily appreciate that: upon ranking various pieces of matching information based on the total amount of user response of respective categories to which the various pieces of matching information belong, matching information within each category may further be ranked separately based on corresponding amounts of user response.

The data given in Table 1 may be used as an example. Under the disclosed technical scheme, information belonging to Category A should be placed prior to information belonging to Category B, i.e., matching information 1 and 4 are placed prior to matching information 2 and 3. Furthermore, pieces of matching information within a category may further be ranked for a second time based on respective amount of user response of these pieces of matching information. A result obtained may be that matching information 1 should be placed prior to matching information 4, and matching information 3 should be placed prior to matching information 2, with the final ordering result being in the following order: matching information 4, matching information 1, matching information 3, and matching information 2.

As illustrated from the above technical scheme, on one hand, a category that receives a high degree of attention is ensured to be placed in a high rank. On the other hand, under the premise of being within the same category, pieces of matching information within each category are further ranked based on corresponding amount of user response. One of ordinary skill in the art may understand that, upon ranking various pieces of matching information based on a total amount of user response of respective categories to which the various pieces of matching information belong, pieces of matching information within each category may further be ranked according to one or more other factors. Moreover, whenever necessary, a third ranking, a fourth ranking, and so on, may further be performed based on other factors. No further detailed description will be provided in the interest of brevity.

Examples of some specific applications are given below to explain the method for generating a search result of the present disclosure.

For example, in a web page search application, a keyword, "赤壁" (the English translation of which is "Chibi"), is used for search. The search engine finds a number of web pages that match "Chibi" and these web pages belong to various categories. By reading a user response log within a certain period of time and computing a total amount of user response of each category based on categories of web pages, a result as shown in Table 4 is obtained.

TABLE 4

| Category of Web Page | Total Amount of User Response |
| --- | --- |
| Entertainment | 100 |
| Military | 50 |
| History | 60 |
| Travel | 20 |
| Games | 35 |

"Chibi" is a famous ancient Chinese battle, and thus a lot of the matching web pages will naturally belong to the categories of "Military" and "History." At the same time, because "Chibi" often appears in episodes of movies or games, many of the matching web pages belong to the categories of "Entertainment" and "Games." Moreover, "Chibi" is a scenic spot, and therefore some matching web pages will likely belong to the category of "Travel."

Because the amounts of user response are obtained by reading the user response log that is within a certain time period, the points of interest of users in that time period may be reflected. For example, as a movie, "Chibi" has received attention from a large number of people. Therefore, during the time before and after the release of the movie, matching web pages belonging to the category of "Entertainment" are in a greater number than those of other categories, and have a very high user click rate, as shown in Table 4. Under the technical scheme in the present disclosure, if a user uses "Chibi" as a keyword to perform a search, matching web pages belonging to the category of "Entertainment", regardless of what the user click rate is for an individual web page, will obtain higher weighting coefficient and thus be placed in higher ranks in the search result to facilitate the user to click for browsing.

The technical scheme provided in this disclosure may also be used in a search application for electronic commerce. For example, a user uses "laptop" as a keyword to perform a product search. The search engine may find products that are related to laptop computers, laptop batteries, laptop radiators, and even conventional notebooks that are used for writing. Based on classifications of product categories by the electronic commerce website, the laptop computers may belong to a category of "Laptop Complete Unit" while the laptop batteries and the laptop radiators may belong to a category of "Laptop Accessories". The conventional notebooks that are used for writing may belong to a category of "Stationery Supplies" or "Office Supplies". By counting amounts of user response, the real product of concern for most users who use "laptop" for keyword search in existing stage is laptop computers. Therefore, using the technical scheme of the present disclosure, a product belonging to the category of "Laptop Complete Unit" will obtain a higher weighting coefficient and thus be placed in a higher rank in the search result to facilitate the user to click for browsing. Similarly, newly published information relating to products of laptop computers may be placed at higher ranks. Even though cheating practices (e.g., a publisher may increase a number of inquiries or bookmark his/her product information on his/her own) are performed, ranking of a conventional notebook (that belongs to "Stationery Supplies" or "Office Supplies" category) with respect to the keyword "laptop" cannot be improved because the conventional notebook is indeed not a real concern of most users who search for "laptop". (Those users who are concerned with conventional notebooks will perform searches in the scope of "Stationery Supplies" or "Office Supplies" which are unrelated to the technical scheme of the present disclosure. Corresponding details are not described herein.) As illustrated, ranking in a search result generated by the technical scheme of this disclosure adapts much better to the needs of the user and hence effectively improve user experience.

The above two examples are used for illustrative purpose only. Actual online information may include more comprehensive classification levels. For example, "laptop batteries" and "laptop radiators" in the above example are referred to as individual pieces of item information under the category of "Laptop Accessories." In a practical application, "laptop batteries" and "laptop radiators" may correspond to two sub-categories under the category of "Laptop Accessories". Therefore, using the technical scheme provided in the present disclosure, these two sub-categories each has a corresponding total amount of user response. If the user performs a search in the scope of "Laptop Accessories", products of these two sub-categories may separately obtain different weighting coefficients. It can be appreciated that if the user performs a search within a scope of a smallest category, ranking of a search result so obtained will be based on the sizes of the amounts of user response of individual pieces of product information under that category.

The above technical scheme of the present disclosure describes two applications in web page search and electronic commerce search. It is understood that these are merely two exemplary applications of the technical scheme of the present disclosure. In fact, the disclosed technical scheme can be used for various search needs, such as library database search, literature search, and so forth. Furthermore, the scope of the present disclosure is not limited to the Internet field. Other areas such as search within a single computer or a local area network may also employ the technical scheme provided in this disclosure.

Figure 2:
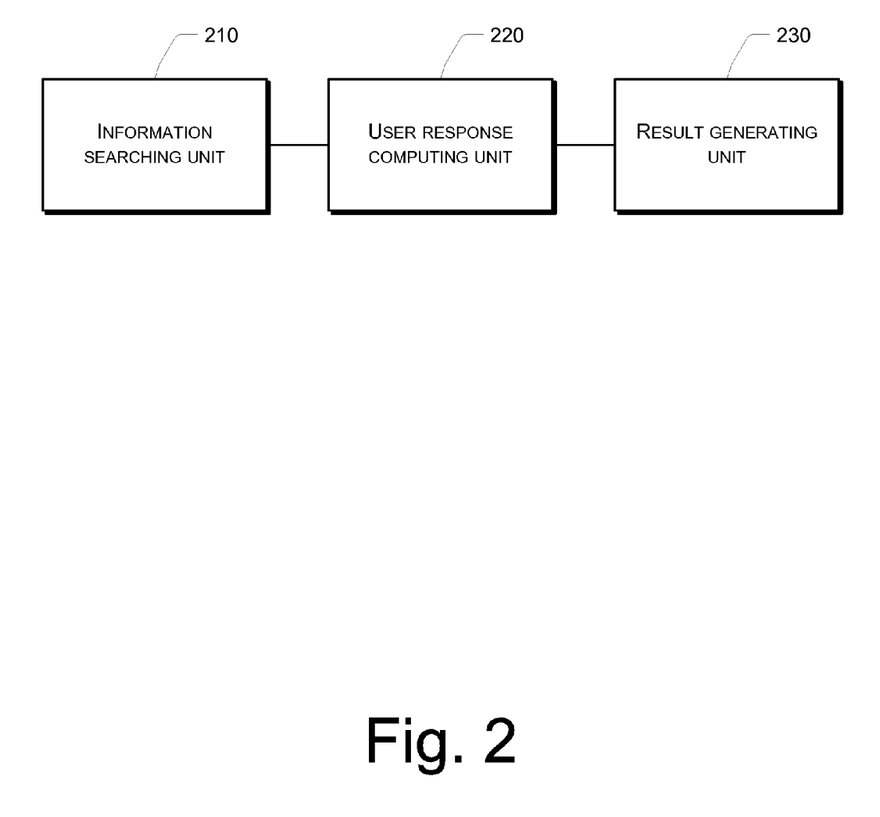
FIG. 2 shows a schematic structural diagram of an exemplary information search system in accordance with the present disclosure.

Corresponding to the above exemplary embodiments, the present disclosure further describes an information search system 200. As shown in FIG. 2, the system 200 includes an information searching unit 210, a user response computing unit 220, and a result generating unit 230.

The information searching unit 210 receives a search request and obtains various pieces of matching information that match the search request by searching. The user response computing unit 220 obtains a respective amount of user response associated with each of the various pieces of matching information and further obtains a total amount of user response that is associated with a respective category to which each of the various pieces of matching information belong. The total amount of user response is a sum of user response of matching information under the category. The result generating unit 230 ranks the various pieces of information to generate a search result based on the total amount of user response that is associated with the respective category to which the various pieces of matching information belongs.

The user response computing unit 220 may obtain the amount of user response of the respective matching information by reading a user response log that is within a certain time period.

Figure 3:
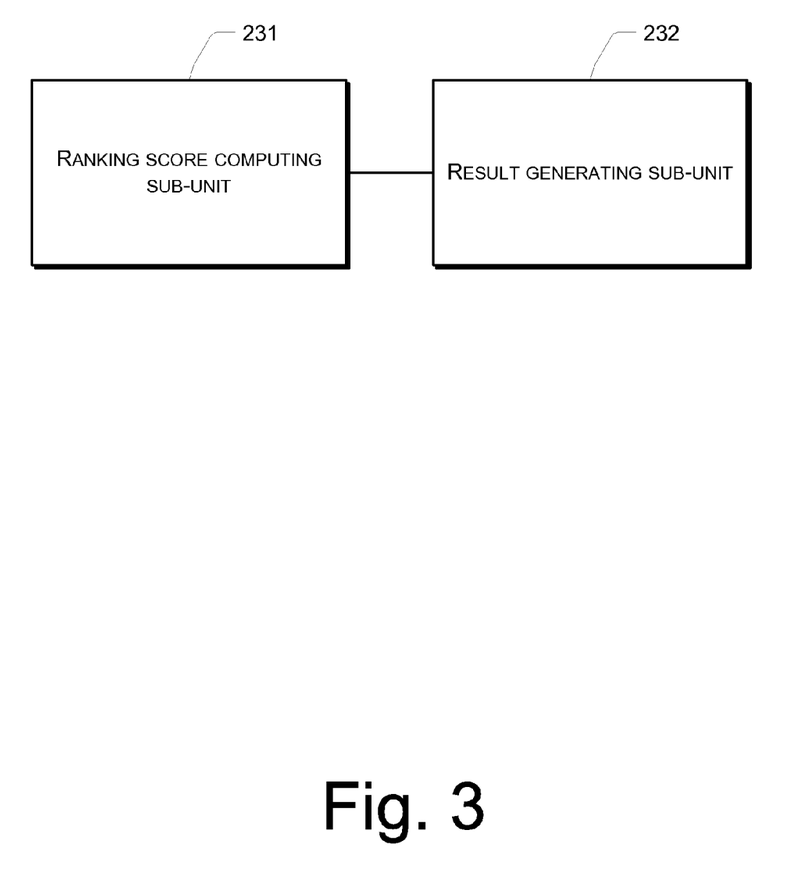
FIG. 3 shows a schematic structural diagram of an exemplary result generating unit in accordance with the present disclosure.

FIG. 3 shows an embodiment of the result generating unit 230. As shown in FIG. 3, the result generating unit 230 may include a ranking score computing sub-unit 231 and a result generating sub-unit 232.

The ranking score computing sub-unit 231 computes ranking scores for the various pieces of matching information by using a total amount of user response that is associated with a respective category to which each of the various pieces of matching information belongs as the weighted parameter, where a value of a weighting coefficient of a first piece of matching information is greater than a value of a weighting coefficient of a second piece of matching information when a total amount of user response that is associated with a category to which the first piece of matching information belongs is greater than a total amount of user response that is associated with a category to which the second piece of matching information belongs. The result generating sub-unit 232 generates the search result based on the ranking scores of the various pieces of matching information.

Figure 4:
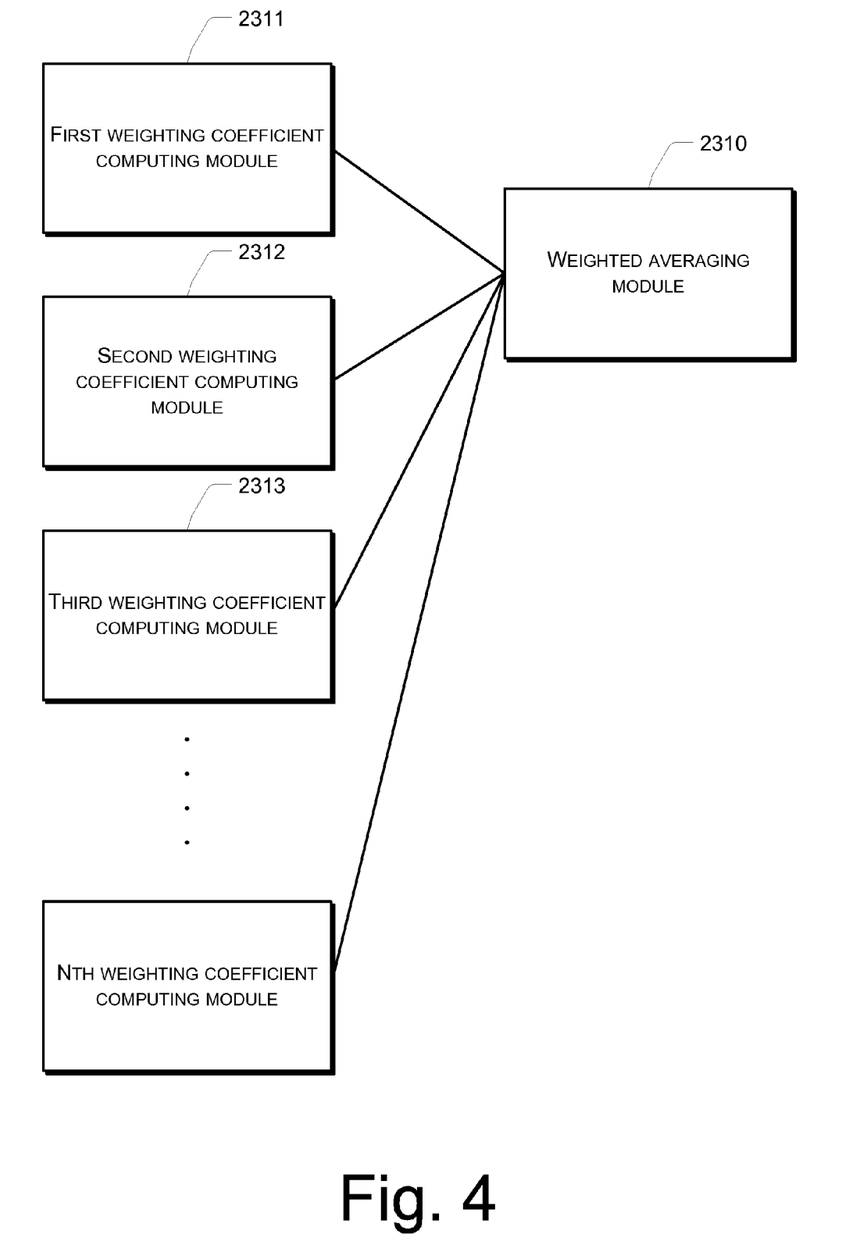
FIG. 4 shows a schematic structural diagram of an exemplary ranking score computing sub-unit in accordance with the present disclosure.

As shown in FIG. 4, the ranking score computing sub-unit 231 may include a first weighting coefficient computing module 2311. The first weighting coefficient computing module 2311 obtains a weighting coefficient for each category to which each of the various matching information belongs based on the total amount of user response that is associated with the respective category to which each of the various pieces of matching information belongs.

One of ordinary skill in the art may understand that the ranking score computing sub-unit 231 may further include a second weighting coefficient computing module 2312, a third weighting coefficient computing module 2313, and so on, for computing weighting coefficients corresponding to other weighted parameters.

The ranking score computing sub-unit 231 may further include a weighted averaging module 2310. The weighted averaging module 2310 performs a weight average processing of weighting coefficients including a computation result of the first weighting coefficient computing module 2311 to obtain the ranking scores of the various pieces of matching information.

Specifically, the first weighting coefficient computing module 2311 may compute a ratio among the total amount of user response of each category of matching information, and obtain the weighting coefficient for each category of matching information based on this ratio. Alternatively, the first weighting coefficient computing module 2311 may arrange the total amount of user response of each category of matching information in an order, and based on the order result, obtain the weighting coefficient of each category of matching information.

Figure 5:
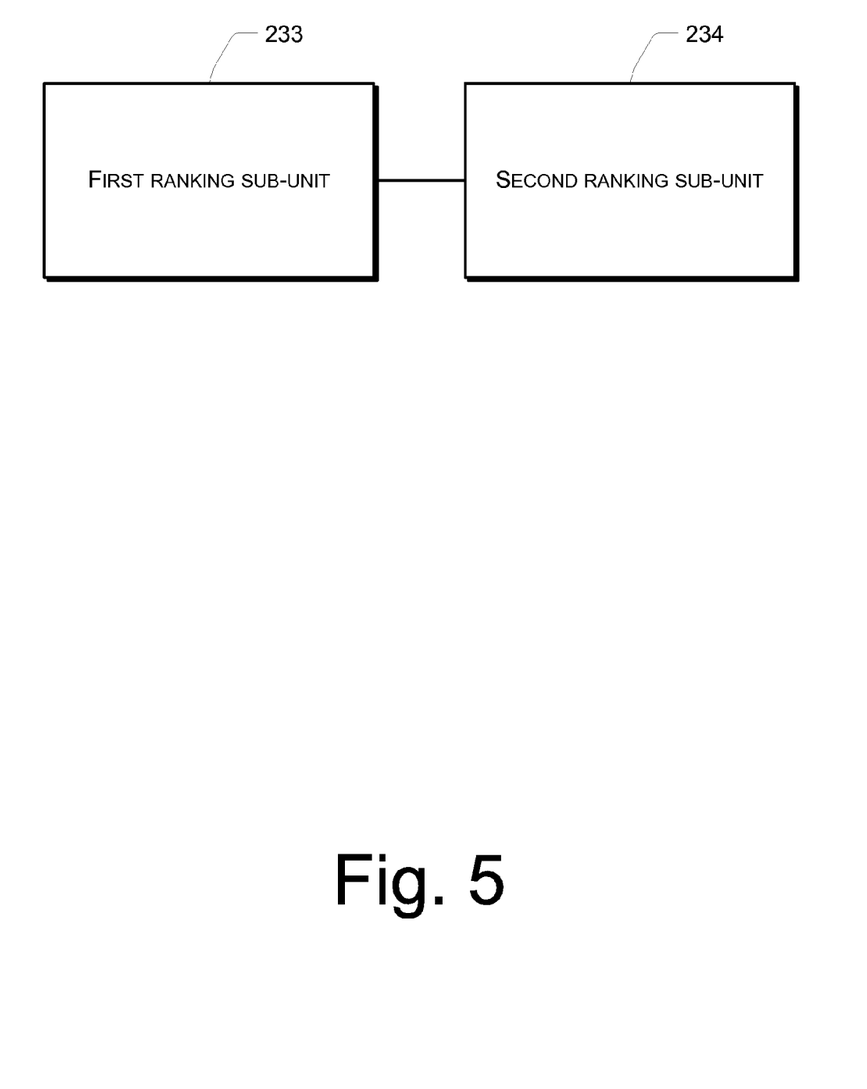
FIG. 5 shows a schematic structural diagram of another exemplary result generating sub-unit in accordance with the present disclosure.

As shown in FIG. 5, the result generating unit 230 may include a first ranking sub-unit 233 and a second ranking sub-unit 234.

The first ranking sub-unit 233 ranks the various pieces of matching information based on the total amount of user response that is associated with the respective category to which each of the various pieces of matching information belongs. The second ranking sub-unit 234 ranks matching information within each category based on the amount of user response of respective various pieces of matching information.

The information search system 200 described above may be a search engine that is used for Internet search, or may be an information search system that is used for searching within a single computer or within a local area network.

Amount of user response may not necessarily be the sole factor for search result ranking. Other factors such as a degree of relevance between a keyword inputted by a user and information displayed in a web page or page rank value of a web page may be used together with the amount of user response to be factors for search result ranking.

For the sake of convenient description, the above system is functionally divided into various units which are separately described. When implementing the disclosed system, the functions of various units may be implemented in one or more instances of software and/or hardware.

From the exemplary embodiments described above, one of ordinary skill in the art can clearly understand that the disclosed method and system may be implemented using software and universal hardware platform. Based on this understanding, the technical scheme of the present disclosure, or portions contributing to existing technologies, may be implemented in the form of software products which are stored in a storage media such as ROM/RAM, hard drive and optical disk. The software includes instructions for a computing device (e.g., personal computer, server or networked device) to execute the method described in the exemplary embodiments of the present disclosure.

The various exemplary embodiments are progressively described in the present disclosure. Same or similar portions of the exemplary embodiments can be mutually referenced. Each exemplary embodiment has a different focus than other exemplary embodiments. In particular, the exemplary system embodiment has been described in a relatively simple manner because of its fundamental correspondence with the exemplary method. Details thereof can be referred to related portions of the exemplary method. Descriptions of the above exemplary system are meant for illustrative purpose only. Units described as separate components therein may or may not be physically separated. Components illustrated in terms of units may or may not be physical units, e.g., may be located in one place or may be distributed among multiple network units. Depending on the actual needs, the goal of the exemplary embodiments may be achieved by selecting parts or all of the modules. One of ordinary skill in the art can understand and implement the disclosed system without any innovative effect.

The disclosed method and system may be used in an environment or in a configuration of universal or specialized computer systems. Examples include a personal computer, a server computer, a handheld device or a portable device, a tablet device, a multi-processor system, a microprocessor-based system, a set-up box, a programmable customer electronic device, a network PC, a small-scale computer, a large-scale computer, and a distributed computing environment including any system or device above.

The present disclosure may be described within a general context of computer-executable instructions executed by a computer, such as a program module. Generally, a program module includes routines, programs, objects, modules, and data structure, etc., for executing specific tasks or implementing specific abstract data types. The disclosed method and server may also be implemented in a distributed computing environment. In the distributed computing environment, a task is executed by remote processing devices which are connected through a communication network. In distributed computing environment, the program module may be located in storage media (which include storage devices) of local and remote computers.

Above are only preferred exemplary embodiments of the present disclosure. However, the present disclosure is not limited hereto. It is appreciated that one of ordinary skill in the art can alter or modify the present disclosure in many different ways without departing from the spirit and the scope of this disclosure. These modifications and variations should therefore be considered to fall within the scope of the claims of the present disclosure and their equivalents.

What is claimed is:

1. A computer-implemented method for generating a search result, the method comprising:
    based on a received search request, obtaining a plurality of pieces of matching information that match the search request by searching in an information search system;
    obtaining a respective amount of user responses associated with each piece of the plurality of pieces of matching information;
    calculating a total amount of user responses associated with a respective category to which each piece of the plurality of pieces of matching information belongs;
    calculating a first score for a first piece of matching information of the plurality pieces of matching information using first user responses corresponding to the first piece of matching information that belongs to a first category;
    calculating a second score for a second piece of matching information of the plurality pieces of matching information using second user responses corresponding to the second piece of matching information that belongs to a second category, the calculating the total amount of user responses associated with the respective category comprising obtaining a first total amount of user responses of the first category and a second total amount of user responses of the second category in a predetermined time period; and
    ranking the first piece of matching information and the second piece of matching information to generate a search result using the first score, the second score, the first total amount of user responses of the first category and the second total amount of user responses of the second category.

2. The computer-implemented method as recited in claim 1, wherein the total amount of user responses associated with the respective category comprises a sum of user responses of matching information under the respective category.

3. The computer-implemented method as recited in claim 1, wherein obtaining the respective amount of user responses associated with each piece of the plurality pieces of matching information comprises:
   obtaining the respective amount of user responses associated with each piece of the plurality of pieces of matching information by reading a user response log that records user responses corresponding to a plurality of search results within a predetermined period of time.

4. The computer-implemented method as recited in claim 1, further comprising ranking the plurality of pieces of matching information, wherein ranking the plurality of pieces of matching information comprises:
   computing ranking scores for the plurality pieces of matching information by using the total amount of user responses associated with the respective category to which each piece of the plurality of pieces of matching information belongs as a weighted parameter, wherein a value of a weighting coefficient of a third piece of matching information is greater than a value of a weighting coefficient of a fourth piece of matching information when a total amount of user responses associated with a third category to which the third piece of matching information belongs is greater than a total amount of user responses associated with a fourth category to which the fourth piece of matching information belongs.

5. The computer-implemented method as recited in claim 4, wherein using the total amount of user responses associated with the respective category to which each piece of the plurality of pieces of matching information belongs as the weighted parameter comprises:
   computing a ratio among the total amount of user responses of each category of matching information; and
   calculating the weighting coefficient for each category of matching information based on the ratio.

6. The computer-implemented method as recited in claim 4, wherein using the total amount of user responses associated with the respective category to which each piece of the plurality of pieces of matching information belongs as the weighted parameter further comprises:
   arranging the total amount of user responses of each category of matching information in an order; and
   based on the arranging, calculating the weighting coefficient of each category of matching information.

7. The computer-implemented method as recited in claim 1, further comprising:
   ranking one or more pieces of matching information within each category based at least in part on corresponding one or more amounts of user responses the one or more pieces of matching information.

8. The computer-implemented method as recited in claim 1, wherein the search request comprises a search request for a web page or a search request associated with electronic commerce.

9. The computer-implemented method as recited in claim 1, wherein the search request comprises a search request for a web page, and the respective amount of user responses comprises at least one of a number of clicks of a web page link, and a number of times a web page link is bookmarked.

10. The computer-implemented method as recited in claim 1, wherein the search request comprises a search request associated with electronic commerce, and the respective amount of user responses comprises at least one of a sale volume of a product, a total transaction amount of the product, a number of times the product is inquired, and a number of times information of the product is bookmarked.

11. An information search system comprising:
   one or more processors;
   memory;
   an information searching unit stored in the memory and executable by the one or more processors that:
      receives a search request and
      obtains, by searching, a plurality of pieces of matching information that match the search request;
   a user response computing unit stored in the memory and executable by the one or more processors that:
      obtains respective amounts of user responses corresponding to the plurality of pieces of matching information, and
      calculates total amounts of user responses within categories to which the plurality of pieces of matching information respectively belong, a total amount of user responses within a category including a sum of user responses corresponding to one or more pieces of the plurality of pieces of matching information that belong to the category; and
   a result generating unit stored in the memory and executable by the one or more processors that:
      computes ranking scores for the plurality of pieces of matching information by using the total amounts of user responses associated with the categories to which the plurality of pieces of matching information respectively belong as weighted parameters, wherein a value of a weighting coefficient of a first piece of matching information is greater than a value of a weighting coefficient of a second piece of matching information when a total amount of user responses associated with a first category to which the first piece of matching information belongs is greater than a total amount of user responses associated with a second category to which the second piece of matching information belongs;
      ranks the plurality of pieces of information based at least in part on the ranking scores; and
      generates a search result based on the ranking scores of the plurality of pieces of matching information.

12. The system as recited in claim 11, wherein the user response computing unit further calculates a amount of user responses of a piece of matching information of the plurality of pieces of matching information by reading a user response log that records user responses within a certain time period.

13. The system as recited in claim 11, further comprising:
   a first weighting coefficient computing module that obtains a weighting coefficient for a respective category to which a piece of the plurality of pieces of matching information belongs based on a total amount of user responses associated with the respective category to which the piece of the plurality of pieces of matching information belongs; and
   a weighted averaging module that performs a weighted average processing of weighting coefficients to obtain the ranking scores of the plurality of pieces of matching information.

14. The system as recited in claim 13, wherein the first weighting coefficient computing module computes a ratio among the total amount of user responses of each category of matching information, and obtains the weighting coefficient for each category of matching information based on the ratio.

15. The system as recited in claim 13, wherein the first weighting coefficient computing module arranges the total amount of user responses of each category of matching information in an order, and, based on the order, obtains the weighting coefficient of each category of matching information.

16. The system as recited in claim 11, wherein the result generating unit comprises:
    a first ranking sub-unit that ranks the plurality of pieces of matching information based on the total amounts of user responses associated with the categories to which the plurality of pieces of matching information respectively belong; and
    a second ranking sub-unit that ranks the one or more pieces of the plurality of pieces of matching information within the category based on corresponding one or more of user responses of the one or more pieces of the plurality of pieces of matching information.

17. One or more non-transitory storage media comprising computer-executable instructions that, when executed by one or more processors, cause the one or more processors to perform acts comprising:
    based on a received search request, obtaining a plurality of pieces of matching information that match the search request by searching in an information search system;
    obtaining a respective amount of user responses associated with each piece of the plurality of pieces of matching information;
    calculating a total amount of user responses associated with a respective category to which each piece of the plurality of pieces of matching information belongs;
    calculating a first score for a first piece of matching information of the plurality pieces of matching information using first user responses corresponding to the first piece of matching information that belongs to a first category;
    calculating a second score for a second piece of matching information of the plurality pieces of matching information using second user responses corresponding to the second piece of matching information that belongs to a second category, the calculating the total amount of user responses associated with the respective category comprising obtaining a first total amount of user responses of the first category and a second total amount of user responses of the second category in a predetermined time period; and
    ranking the first piece of matching information and the second piece of matching information to generate a search result using the first score, the second score, the first total amount of user responses of the first category and the second total amount of user responses of the second category.

18. The one or more non-transitory storage media as recited in claim 17, wherein obtaining the respective amount of user responses associated with each piece of the plurality pieces of matching information comprises:
    obtaining the respective amount of user responses associated with each piece of the plurality of pieces of matching information by reading a user response log that records user responses corresponding to a plurality of search results within a predetermined period of time.

19. The one or more non-transitory storage media as recited in claim 17, the acts further comprising ranking the plurality of pieces of matching information, wherein ranking the plurality of pieces of matching information comprises:
    computing ranking scores for the plurality pieces of matching information by using the total amount of user responses associated with the respective category to which each piece of the plurality of pieces of matching information belongs as a weighted parameter, wherein a value of a weighting coefficient of a third piece of matching information is greater than a value of a weighting coefficient of a fourth piece of matching information when a total amount of user responses associated with a third category to which the third piece of matching information belongs is greater than a total amount of user responses associated with a fourth category to which the fourth piece of matching information belongs.

20. The one or more non-transitory storage media as recited in claim 17, the acts further comprising:
    ranking one or more pieces of matching information within each category based at least in part on corresponding one or more amounts of user responses the one or more pieces of matching information.

* * * * *